(12) United States Patent
Vaddiparty et al.

(10) Patent No.: US 6,628,921 B1
(45) Date of Patent: Sep. 30, 2003

(54) RETURN LINK CHANNEL LOADING OF MULTIPLE SATELLITES WITH MULTIPLE SPREAD SPECTRUM USER TERMINALS

(75) Inventors: Subrahmanyam V. Vaddiparty, San Jose, CA (US); Paul A. Monte, San Jose, CA (US); Yiming Yao, San Jose, CA (US)

(73) Assignee: Globalstar L.P., San Jose, CA (US)

( * ) Notice: Subject to any disclaimer, the term of this patent is extended or adjusted under 35 U.S.C. 154(b) by 551 days.

(21) Appl. No.: 09/687,664

(22) Filed: Oct. 13, 2000

(51) Int. Cl.$^7$ ............................ H04B 7/185; H04Q 7/20
(52) U.S. Cl. ................ 455/12.1; 455/450; 455/452; 455/427; 455/464
(58) Field of Search .................... 455/12.1, 13.1, 455/427, 450, 509, 452, 464, 403, 422, 453, 7, 512

(56) References Cited

U.S. PATENT DOCUMENTS

| | | | | |
|---|---|---|---|---|
| 6,088,572 A | * | 7/2000 | Vatt et al. .................. | 455/13.1 |
| 6,154,450 A | * | 11/2000 | Wallentin et al. ............ | 370/311 |
| 6,222,828 B1 | * | 4/2001 | Ohlson et al. ............... | 370/320 |
| 6,463,279 B1 | * | 10/2002 | Sherman et al. ............. | 455/427 |
| 6,526,260 B1 | * | 2/2003 | Hick et al. ................. | 455/67.11 |
| 6,567,645 B1 | * | 5/2003 | Wiedeman et al. ......... | 455/12.1 |

* cited by examiner

*Primary Examiner*—Nay Maung
*Assistant Examiner*—Edan Orgad
(74) *Attorney, Agent, or Firm*—Ohlandt, Greeley, Ruggiero & Perle, LLP

(57) ABSTRACT

The satellite communication system comprises a plurality of satellites. The frequency bandwidth of the return link to each satellite is subdivided into a plurality of channels. The method includes steps of finding a total interference in each channel, calculating a predicted total interference from addition of a first user terminal to each channel, determining if the predicted total interference is a minimum, and allocating the first channel to the first user terminal. The predicted total interference is calculated for each channel of the plurality of channels in the return link to each of at least two satellites. The first channel is allocated to the first user terminal if the predicted total interference in the first channel is the minimum value.

11 Claims, 9 Drawing Sheets

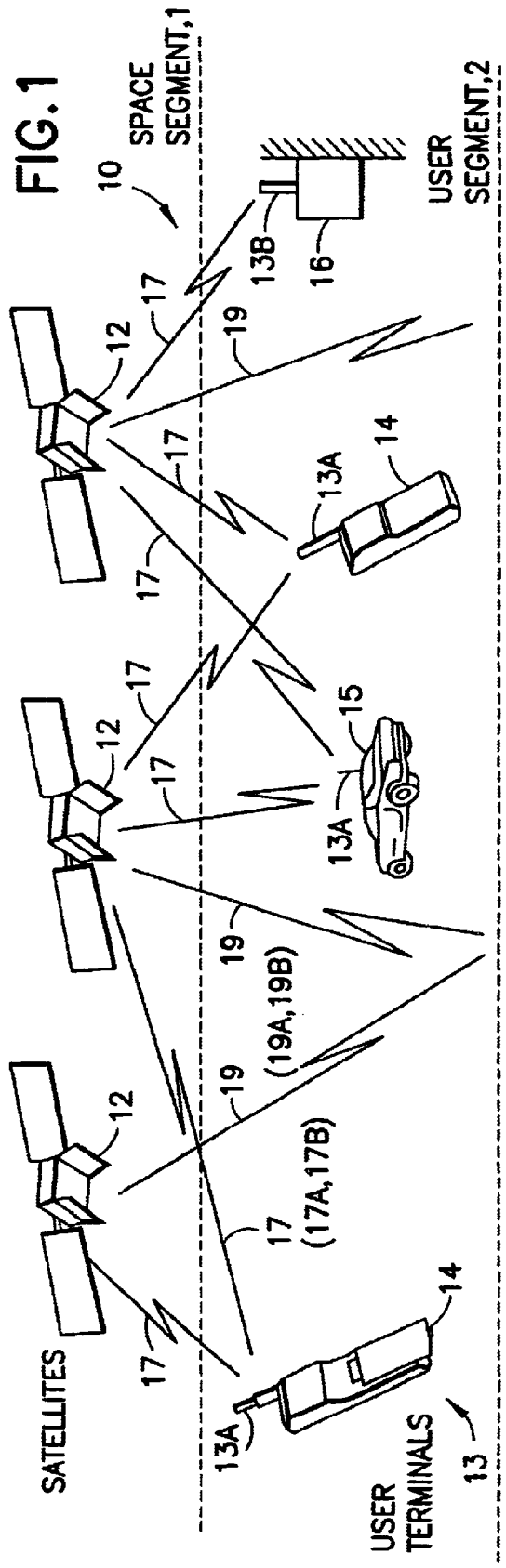
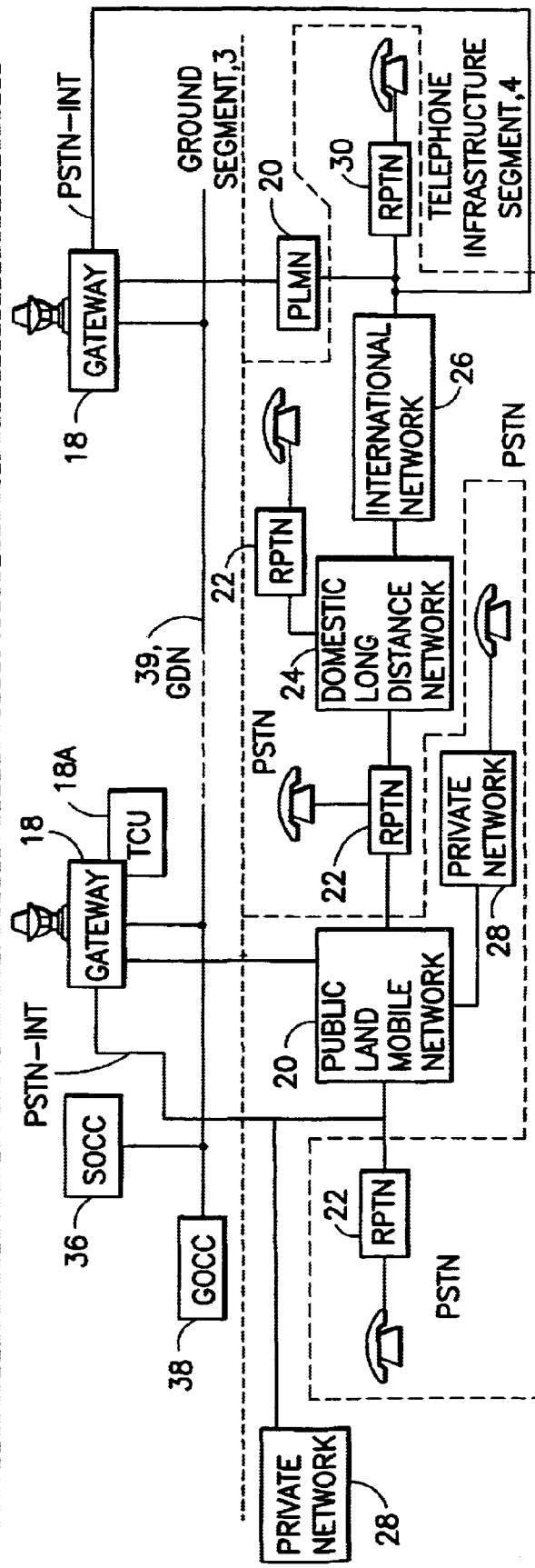
FIG. 1

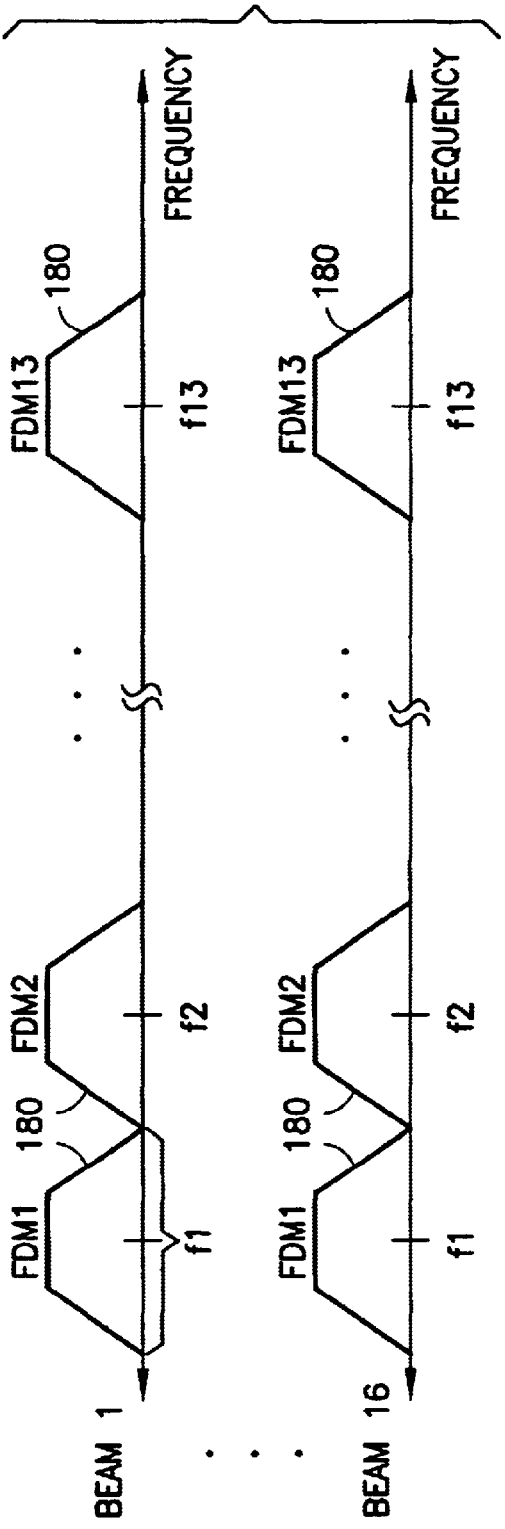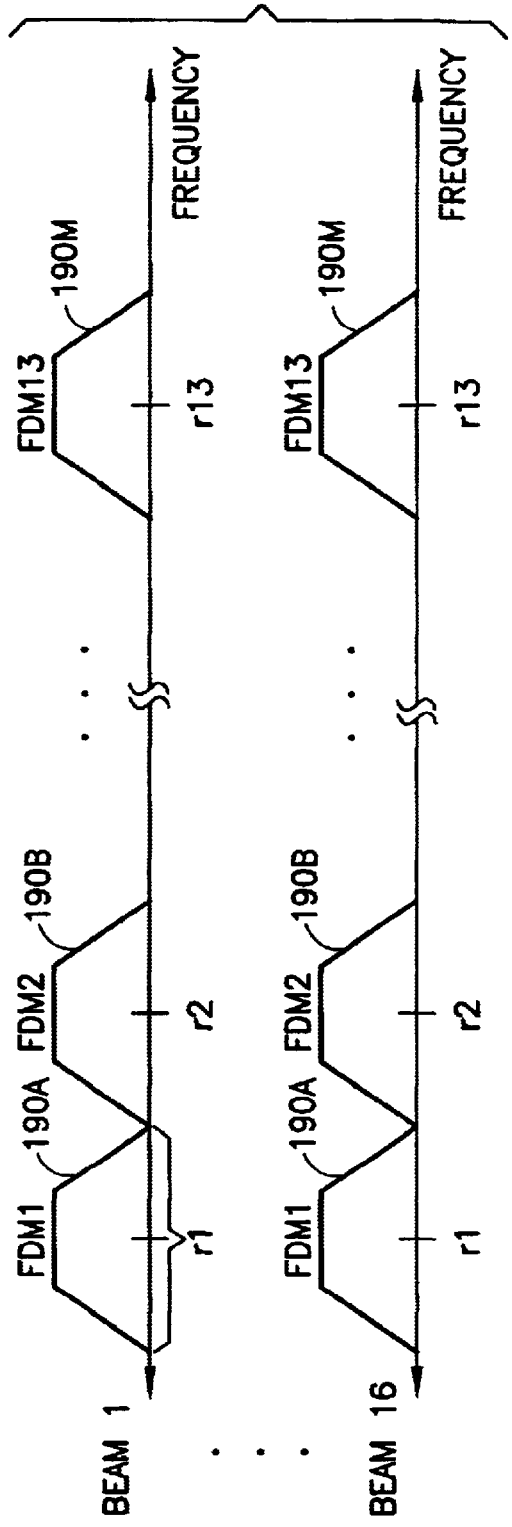

TABLE OF $(I_o + \Delta I_o)/N_o$ IN SATELLITE #k (MAX=48)
(PER CHANNEL PER BEAM) [20]

|        | CH 1 | CH 2 | . | . | . | CH 9 |
|--------|------|------|---|---|---|------|
| BEAM 1 |      |      |   |   |   |      |
| BEAM 2 |      |      |   |   |   |      |
| .      |      |      |   |   |   |      |
| .      |      |      |   |   |   |      |
| BEAM 16|      |      |   |   |   |      |

TABLE OF $(I_o + \Delta I_o)/N_o$ IN SATELLITE #1
(PER CHANNEL PER BEAM) [20]

|         | CH 1 | CH 2 | . | CH j | . | CH 9 |
|---------|------|------|---|------|---|------|
| BEAM 1  |      |      |   |      |   |      |
| BEAM 2  |      |      |   |      |   |      |
| .       |      |      |   |      |   |      |
| .       |      |      |   |      |   |      |
| BEAM 16 |      |      |   |      |   |      |

FIG.5

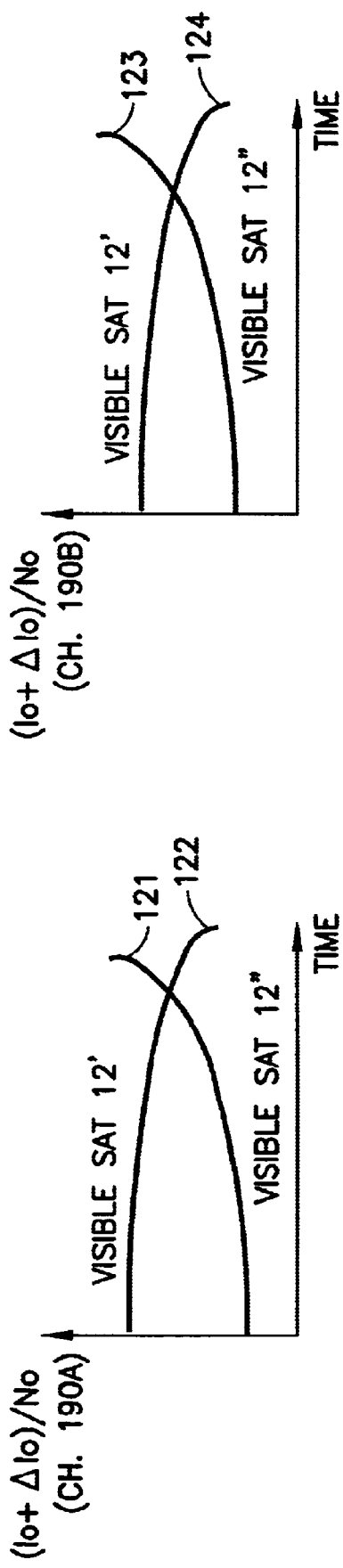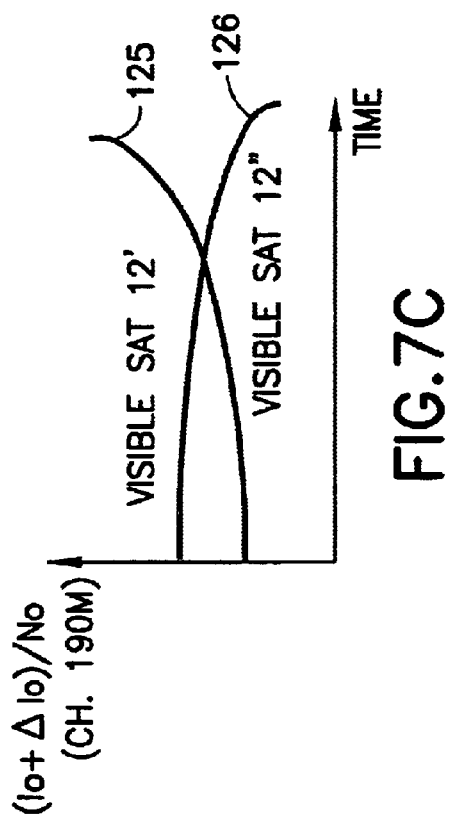

INTERFERENCE TO THERMAL NOISE DENSITY MATRIX ($\mu$) [27] IN THE EXAMPLE CASE OF 13 AVAILABLE FDM CHANNELS AND TWO VISIBLE SATELLITES [2]

| $\mu(1,1)$ | $\mu(1,2)$ |
|---|---|
| $\mu(2,1)$ | $\mu(2,2)$ |
| $\mu(3,1)$ | $\mu(3,2)$ |
| $\mu(4,1)$ | $\mu(4,2)$ |
| ⋮ | ⋮ |
| $\mu(13,1)$ | $\mu(13,2)$ |

RETURN LINK CHANNEL LOADING OF MULTIPLE SATELLITES WITH MULTIPLE SPREAD SPECTRUM USER TERMINALS

FIELD OF THE INVENTION

This invention relates in general to satellite-based communication systems, and specifically, to satellite-based mobile telecommunication systems.

BACKGROUND OF THE INVENTION

Satellite communication systems are well known in the prior art. Examples of such systems are disclosed in U.S. Pat. No. 5,303,286 and other publications that are of record in said patent. In satellite communication systems, user terminals and gateways generally communicate with each other via one or more co-visible satellites (i.e. satellites "seen" by both the user terminals and the gateways). Some of the user terminals have broad beam antennas which illuminate much of the sky. The broad beam illumination contributes to interference with other user terminals using the covisible satellites. Furthermore, user terminals and gateways of the satellite communication system may communicate using a spread spectrum (SS) code division multiple access (CDMA) technique. The nature of communication using SS CDMA method is that the signal from a single user terminal is spread across the entire bandwidth of a given communication channel. Therefore, all user terminals communicating on a given communication channel may contribute to interference with another user terminal communicating on that channel. An increase in the number of user terminals on a given communication channel tends to increase overall interference, as does an increase in any individual user terminal's transmit power when it is desired to boost the signal over the overall interference level of the channel.

OBJECTS AND ADVANTAGES OF THE INVENTION

It is a first object and advantage of this invention to provide a system and method to minimize total interference within a given channel of a satellite communication system.

It is a second object and advantage of this invention to provide a satellite communication system having the ability to assign communication channels to user terminals to achieve optimal performance of the satellite communication system.

SUMMARY OF THE INVENTION

The foregoing and other problems are overcome and the objects of the invention are realized by methods and apparatus in accordance with embodiments of this invention, wherein in accordance with a first method of the present invention, a method for maximizing capacity of a satellite communication system is provided. The method comprises the steps of finding a total interference in each frequency channel, calculating a predicted total interference from the addition of a first user terminal on each frequency channel, determining if the predicted total interference in a first channel is a minimum value, and allocating the first channel to the first user terminal. The total interference is found for each channel of a plurality of channels which subdivide a predetermined frequency band of a return link for at least two satellites. The predicted total interference from the addition of the first user terminal is calculated in each channel of the plurality of channels in the return link for each of the least two satellites. A determination of whether the predicted total interference is a minimum value in the first channel is made with respect to all predicted total interference values for the plurality of channels in the return link. The first channel is allocated to the first user terminal if the predicted total interference of the first channel is the minimum value.

In accordance with a second aspect of the present invention, a method is disclosed for assigning a frequency channel to a user terminal of a satellite communications system. The user terminal is assumed to be visible to at least two satellites. The method comprises the steps of identifying a location of the user terminal, determining if a first frequency channel of a plurality of frequency channels has a minimum total interference and, if yes, assigning the first frequency channel to the user terminal. If not, a next step determines if a second frequency channel has a total interference below a predetermined threshold and, if yes, assigns the second frequency channel to the user terminal. If this test fails, the method then determines if a third frequency channel has a total interference below the predetermined threshold for a first one of the two satellites, and a total interference above the predetermined threshold for a second one of the two satellites. If yes, the method determines if the first satellite is at a lower elevation angle than the second satellite, relative to the user terminal, and if yes, the method assigns the third channel to the user terminal, otherwise a fourth frequency channel is assigned for the return link of the user terminal. The location of the user terminal may be identified when the user terminal requests service. Determination of whether the first frequency channel has a minimum total interference is made for the return link of the user terminal to each one of the two satellites. The determination if the second frequency channel has a total interference below the predetermined threshold is also made for the return link of the user terminal to each satellite.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a block diagram of a satellite communication system that is constructed and operated in accordance with a presently preferred embodiment of this invention;

FIGS. 3A and 3B respectively, are graphical representations of a forward radio-frequency (RF) link spectrum and a return RF link spectrum used by the communication system of FIG. 1, showing the frequency division multiplexing (FDM) of forward and return link beams;

FIG. 5 is a three dimensional matrix graphically depicting a database of interference values per satellite per return link FDM channel per beam of the communication system of FIG. 1;

FIGS. 7A–7C are three graphs respectively depicting the total interference density with respect to time on three different FDM channels of two satellites of the system of FIG. 1, when a new user terminal return link is added to the subject channels of the two satellites;

FIG. 8 is a two dimensional matrix graphically depicting the average interference density in each FDM channel per satellite available for use by a new user terminal to communicate with a gateway of the system shown in FIG. 1.

DETAILED DESCRIPTION OF THE INVENTION

Figure 2:
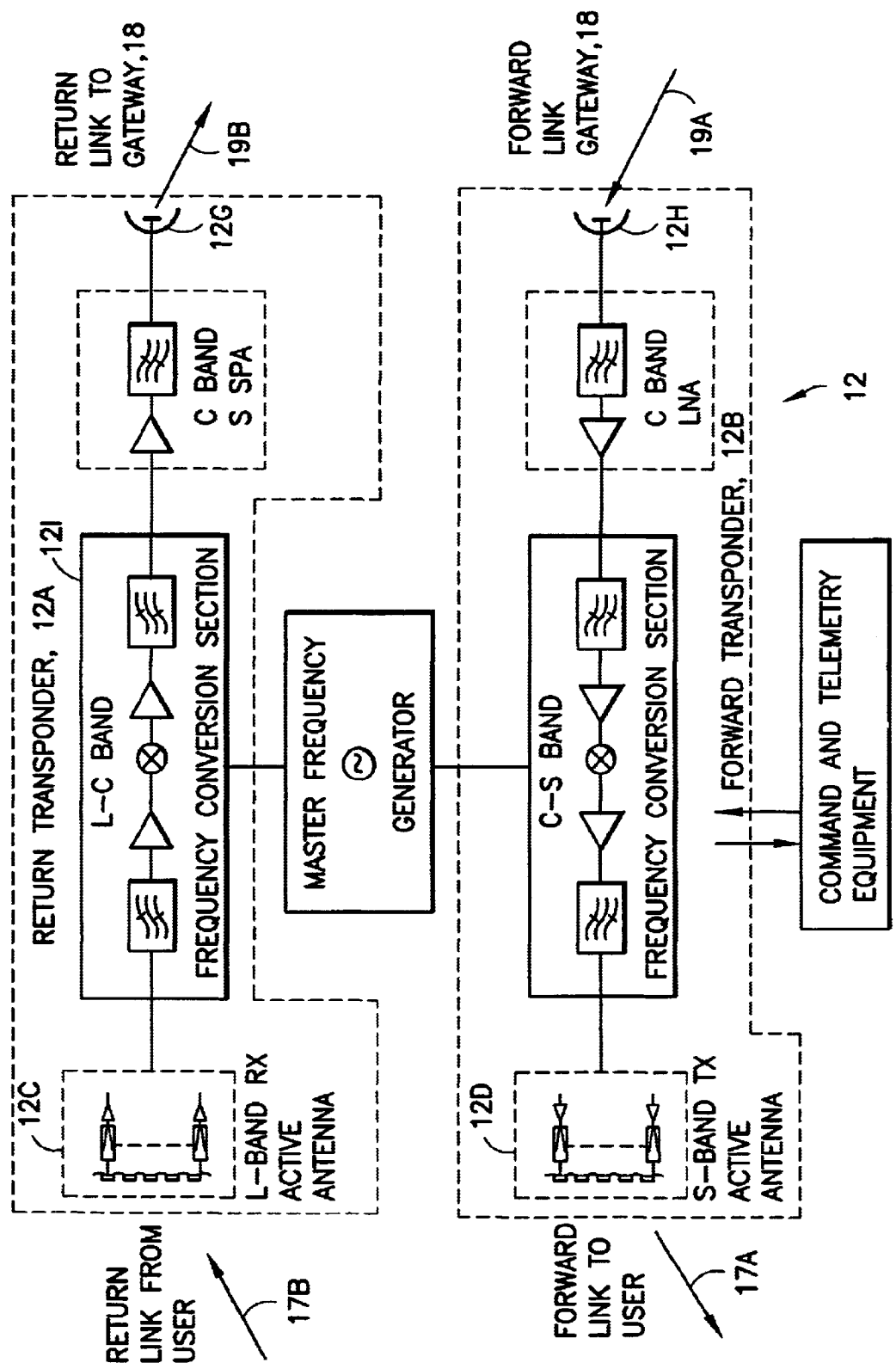
FIG. 2 is a block diagram of the communications payload of one of the satellites of the satellite communication system of FIG. 1.

FIG. 1 illustrates a presently preferred embodiment of a satellite communication system 10, such as for example the Globalstar™ system, which is suitable for use with the presently preferred embodiment of this invention. Although the present invention will be described with reference to the embodiment shown in the drawings, it should be understood that the present invention can be embodied in many alternate forms of embodiments.

The satellite communication system 10 shown in FIG. 1 generally comprises a space segment 1, a user segment 2, a ground segment 3 and a telephone system infrastructure segment 4. Satellite communication systems are described in U.S. Pat. Nos. 5,619,525, 5,758,261, 5,634,190 and 5,640,386, which are incorporated by reference herein in their entirety. In the preferred embodiment, the space segment 1 comprises a network of satellites 12 in Low Earth Orbit (LEO). The constellation of LEO satellites 12 contains an appropriate number of satellites distributed in a suitable number of orbital planes such that the system 10 provides substantial full-earth coverage with preferably, at least two satellites 12 in view at any given time from a particular user location. The satellites 12 effect communication between user terminals 13 and gateways 18. Thus, a user terminal 13 may communicate from substantially any point on Earth with any other point via one or more gateways 18 and one or more 10 satellites 12, possibly also using a portion of the telephone infrastructure segment 4. In the preferred embodiment, the satellites 12 function solely as "bent-pipe" repeaters. As such, the satellites 12 receive communication traffic signals (such as speech and/or data) from user terminals 13 or from gateways 18, convert the signals to another frequency band and then re-transmit the converted signal. There is no on-board signal processing of a received communications traffic signal. In alternate embodiments, the satellites may be configured to perform some, or complete, on-board processing of received communications traffic signals.

The user segment 2 includes a plurality of user terminals 12. Each user terminal 13 comprises a transmitting device capable of operating with the satellite system 10. The user terminals 13 include generally a plurality of different types such as hand-held mobile radio-telephones 14, fixed radio-telephones 16 or vehicle mounted radio-telephones 15. The user terminals 13 contain the necessary baseband and RF electronics and antennas to both transmit and receive via satellites 12 voice and/or data with the appropriate signaling structure. The user terminals 13 are preferably provided with omni-directional antennas 13a for bi-directional communication via one or more of the satellites 12. The vehicle mounted 15 and fixed 16 radio-telephones may also incorporate directional antennas 13b. The directional antennas on fixed radio-telephones 16 may be pointed (steered). Otherwise, the fixed radio-telephones may incorporate multiple antenna elements which may be switched (commutated).

The user terminals 13 may be capable of operating in a full duplex mode and communicate via, by example, L-band RF links (uplink or return link 17b) and S-band RF links (downlink or forward link 17a) through return and forward satellite transponders 12a and 12b respectively. The return L band RF links 17b may operate within a frequency range of 1.61 GHz to 1.625 GHz, a bandwidth of 16.5 MHz. The return links 17b are modulated with packetized digital voice and/or data signals using a spread spectrum (SS) technique. In the preferred embodiment, the spread spectrum communications technique employs Direct Sequence (DS) spreading in conjunction with Code Division Multiple Access (CDMA). The forward S band RF links 17a may operate within a frequency range of 2.485 GHz to 2.5 GHz, with a bandwidth of 16.5 MHz. The forward links 17a are also modulated at a gateway 18 with packetized digital voice and/or data signals using the DS-CDMA technique.

The ground segment 3 includes at least one, but generally a plurality of the gateways 18 that communicate with the satellites 12 via, by example, a full duplex C band RF link 19 (forward link 19a (to the satellite) and return link 19b (from the satellite)) that operates within a range of frequencies preferably in the C-band. The C-band RF links 19 bi-directionally convey the communication feeder links, and also convey satellite commands to the satellites and telemetry information from the satellites 12. The forward feeder link 19a may operate in the band of 5 GHz to 5.25 GHz, and the return feeder link 19b may operate in the band of 6.875 GHz to 7.075 GHz. The satellite 12 has feeder link antennas 12g and 12h through which duplex communication between the satellite 12 and gateway 18 are conducted. The gateway 18 receives the return link 19b energy transmitted by all satellites 12 within its field-of-view, and contains all of the necessary RF, down conversion/demodulation and based band electronics to reproduce the voice/data generated at the user terminals in digital form. The gateway 18 interfaces the resulting digital stream to Public Switched Telephone Network (PSTN) infrastructure segment 4. Once this voice/data has entered the PSTN infrastructure, the voice/data is directed to its desired destination, including back to another user terminal within the referenced satellite communication system, if desired. Conversely, voice/data entering the gateway 18 through the PSTN infrastructure is transmitted via the forward link 19a to the satellites 12 which amplify, down-convert from C- to S-band and re-transmit via forward link 17a to the user terminal 13.

The ground segment 3 also comprises a Satellite Operations Control Center (SOCC) 36 and a Ground Operations Control Center (GOCC) 38. A communications path 39 is provided for interconnecting the gateways 18, SOCC 36 and GOCC 38. This portion of the communications system 10 provides overall system control functions.

Also as shown in FIG. 1, the PSTN infrastructure segment 4 generally comprises existing telephone systems. For example, the PSTN infrastructure includes Public Land Mobile Network (PLMN) gateways 20, local telephone exchanges such as regional public telephone networks (RPTN) 22 or other local telephone service providers. The PSTN infrastructure may also include domestic long distance networks 24, international networks 26, private networks 28 and other RPTNs 30.

Referring also to FIG. 2, the satellites 12 have L-band 12c and S-band 12d antennas through which full-duplex mode communication is conducted between the satellites 12 and the user terminals 13. The L-band and S-band antennas are multiple beam antennas that provide coverage within an associated terrestrial service region. For example, the L-band 12c and S-band 12d antennas illuminate the earth respectively with 16 beams for receiving from and 16 beams for transmitting to the user terminals 13. Although the structure of these beams may or may not be different, the continuously orbiting constellation of satellites 12 provide coverage on most of the earth's surface 24 hours a day. As this is an integrated world-wide system, subscribers are given the flexibility to use their user terminals 13 anywhere in the world (roaming). Furthermore, in the preferred embodiment, the LEO constellation of satellites 12 may have more than one satellite in view of both (i.e. covisible) a given user terminal 13 and gateway 18, so that multiple communication paths may be established between them. For example, in the satellite communication system 10, each duplex communication between a given one of the user terminals 13 and a corresponding gateway 18 generally comprises a forward link 19a, 17a (gateway 18 to user terminal 13) via two or more satellites 12 in the field of view of both the gateway and user terminal, and a return link 17b, 19b (user terminal 13 to gateway 18) via the covisible satellites 12. Thus, two or more satellites 12 may each convey the same communication between the given user terminal 13 and the gateway 18. Furthermore, the return and forward links 17b, 17a between the user terminal 13 and satellites 12 may use one or more beams of the satellites' L-band and S-band antennas 12c, 12d illuminating the user terminal. The multiple transmission paths coincident with this mode of operation thus provides for diversity combining at the respective receivers, leading to an increased resistance to fading and facilitating the implementation of a soft handoff procedure. The effect of this diversity is exploited to enhance system performance.

The forward link RF spectrum (e.g. 16.5 MHz S-band) preferably contains thirteen different Frequency Division Multiplexed (FDM) channels centered at frequencies $f_1$ to $f_{13}$, which are contiguously spaced within the assigned frequency allocation.

It should be noted that the forward link RF spectrum may contain any number of channels and each channel could have a different bandwidth (e.g., 1.25 MHz, 3.75 MHz, etc.).

FIG. 3A shows a graphical representation of the FDM channels 180 subdividing the beams of the forward downlink 17a (satellite 12 to user terminal 13). The frequency structure of the forward uplink 19a from the gateway 18 to the satellites 12 (not shown) is substantially similar to that of the forward downlink 17a. The FDM channels 180 are, for example, 1.23 MHz wide in frequency. Each of these thirteen FDM channels contain multiple voice and/or data and some overhead functions such as a pilot, paging and synchronization signals. The thirteen FDM channels per forward link beam, and sixteen beam structure of the forward link antenna 12d, provides for a sixteen-fold frequency re-use for forward link transmissions. The preferred DS-CDMA communication technique which is used when transmitting these signals employs up to, for example, 128 different Walsh spreading codes within each FDM channel. This allows a variable number of users to simultaneously occupy the same FDM channel. The gateway 18 transmits the appropriate amount of power through the satellites 12, and by means of link quality measurements at the user terminals 13, the transmit power is dynamically adjusted to achieve optimal link-by-link performance.

The return link 17b, 19b frequency plan is graphically depicted in FIG. 3B. The return link 17b, 19b RF spectrum has similar frequency structure to that of the forward downlink 17a, 19a with, for example, up to thirteen FDM channels 190 centered at frequencies $r_1$ to $r_{13}$ which are contiguously spaced within the assigned return link 17b, 19b bandwidths. The return link 17b, 19b, which also incorporates the DS-CDMA technique, allows up to, by example, 128 users to transmit voice and/or data signals on each return link channel 190. In addition, each return link channel supports signaling information from the user terminals 13 to the gateway 18 including access requests, power change request and registration requests. The return link 17b, 19b generally features active closed-loop power control (i.e. the user terminal's 13 transit power is dynamically altered to account for propagation effects based on received signal strength at the gateway 18). The thirteen FDM channels 190 per return link beam and sixteen beams provide for a sixteen-fold frequency re-use for return link transmissions. The exact number of FDM channels available for the return link, however, may vary on a regional basis depending on the number of operating CDMA systems, regulatory issues, and inter-system coordination efforts. A given user terminal 13 may or may not be assigned a different return link channel 190 than the channel 180 assigned on the forward link. However, when operating in the diversity reception mode on the return link 17b, 19b (the gateway 18 receiving the user terminal's transmission from two or more satellites 12), the user terminal 13 is assigned the same forward and return RF link channel 180, 190 for each of the satellites 12. For both links, the gateway 18, under allocation strategies defined by the GOCC 38, or defined by the gateway itself 18, is responsible for assigning the specific FDM channel to a given user terminal 13. The GOCC 38 is responsible for managing all the gateways 18.

The return link 17b, 19b in the satellite communication system 10 may be different than its forward link 19a, 17a, in that the latter uses coherent detection whereas the former uses non-coherent detection. The user terminals 13 include multiple receivers to accept forward RF link 19a, 17a energy from up to three different paths using a three finger rake receiver (receivers including three distinct RF/IF/Demodulation paths). In the return link 17b, 19b, the gateway 18 may have up to a seven finger rake receiver, thereby non-coherently combining return RF link energy through up to seven different paths. As noted previously, these paths may convey energy between a single gateway 18 through several satellites 12 and/or several beams through one satellite 12.

The near omni-directional antennas of hand-held user terminals 14 and vehicle mounted user terminals 15 illuminate the sky almost uniformly. This broad beam illumination in the return uplink 17b impinges on the covisible satellites 12 and contributes to interference on the return link FDM channels 190. The level of interference on the return link FDM channels directly determines the capacity of the return link FDM channels. Generally, CDMA modulation techniques spread the signal from an individual user terminal 13 across the entire bandwidth of a given FDM channel. Therefore, all users within the FDM channel may represent interference to the signal of interest, unless the other signals are otherwise orthogonal (in code space) to the signal of interest. In the forward link 19a, 17a, all signals within an FDM channel 180 are assigned orthogonal Walsh codes by the gateway 18. In the return link 17b, 19b the overall interference, and hence the capacity of one FDM channel 190, is generally dependent on the signal-to-noise-ratio (SNR), or its equivalent in the digital domain, energy-per-bit to noise-density $$\left(\frac{E_b/N_o}{1+I_o/N_o}\right)1$$

ratio. The terms $E_b$, $N_o$, and $I_o$ respectively represent; the received power per data rate (i.e. energy per bit), the thermal noise density and the total interference noise density (in 1 Hz of the FDM channel bandwidth). The interference density ($I_o$) is a function of the number of user terminals 13 using the FDM channel (i.e. system capacity) and their corresponding transmitted RF power. The term ($I_o/N_o$) represents the additional degradation in a given FDM channel of a given satellite 12 from the ideal no interference ($I_o$=0) case and provides a convenient metric in evaluating the return link performance.

As the number of users in an FDM channel increases, by example, to increase system capacity, then the overall interference increases. In order to achieve the appropriate energy per bit to noise density rate $$\left(\frac{E_b/N_o}{1+I_o/N_o}\right)2$$

on the FDM channel, it may be desirable to increase the transmitted power from the user terminal 13. The higher transmit power from the user terminal in turn further increases the interference to other UTs on the same FDM channel.

The gateway 18, either directly or otherwise under control of the GOCC 38, allocates the resources of the satellite communication system 10 (i.e. satellites 12 and FDM channels 180, 190) to the forward 19a, 17a and return links 17b, 19b to achieve optimal operation of the system. Examples of systems and methods for allocating satellite communication system resources to forward link users are described in U.S. Pat. Nos. 5,592,481 and 5,812,538 incorporated by reference herein in their entirety. In the present invention, the gateways 18, either directly, or under control of the GOCC 38, assign the return link users to specific FDM channels 190 such that the total interference is minimized within the assigned FDM channel and performance of the system is optimized.

Figure 4:
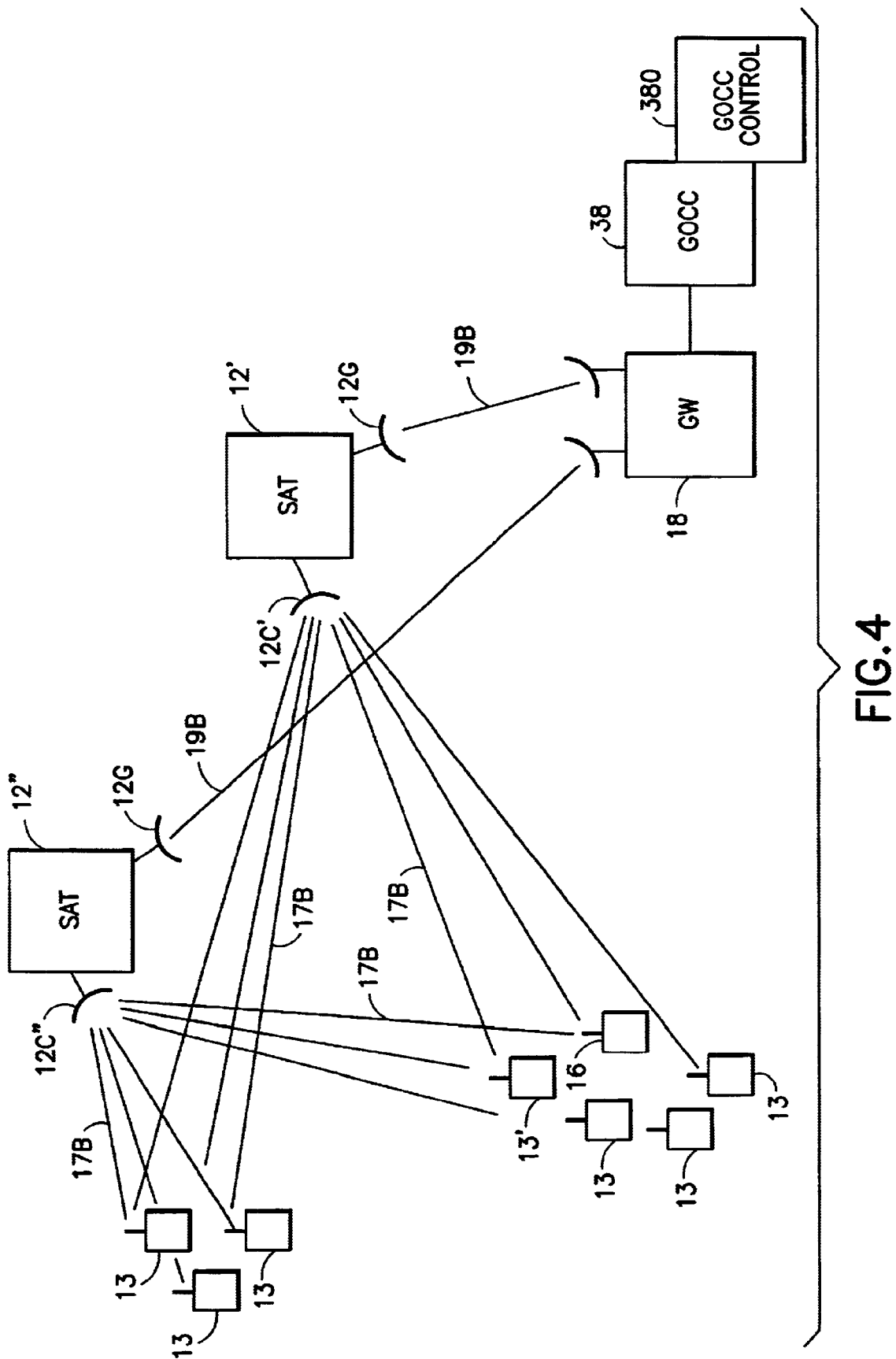
FIG. 4 is a simplified block diagram showing a portion of the communication system shown in FIG. 1.

Referring now to FIG. 4, there is shown a simplified block diagram of a portion of the satellite communication system 10. The present invention will be described with specific reference to this portion of the satellite communication system 10 shown in FIG. 4, though the present invention applies equally to the whole system. In FIG. 4, a number of user terminals 13, 13' are shown transmitting signals to one gateway 18 through two satellites 12', 12" visible to both the user terminals and the gateway. Due to orbital geometry, each of the two satellites 12', 12" is at a different elevation relative to a given user terminal 13, 13'. The user terminals 13, 13' are distributed on the earth's surface so that each user terminal is illuminated by one or more beams of the L-band antenna 12c', 12c" on each of the two satellites 12', 12". A return uplink 17b is established between each user terminal 13 and each satellite 12', 12". Each satellite receives the signals from each transmitting user terminal 13 via the return uplink. Each satellite then repeats the return link signals and transmits them to the gateway 18. Generally, the user terminals 13 are not uniformly distributed, but rather, tend to cluster in geographic regions on the earth's surface. This clustering may lead to some beams illuminating the earth from the satellite L-band (return link) antenna 12c', 12c" being heavily utilized while others remain fallow. The resulting system capacity is thus not maximized, which in turn raises the transmit power demands on the user terminals (i.e. the system performance is non-optimal).

The effects of clustering by user terminals on system performance are mitigated in the present invention by selectively assigning return link channels to the user terminals.

In the preferred embodiment, the GOCC 38 has a master controller 380 which allocates a return link FDM channel to each user terminal in accordance with the method described below. In alternate embodiments, one or more of the gateways may have a controller to allocate the return link FDM channel to the user terminals. Preferably, the master controller 380 is aware of the type and location of each of the user terminals 13 in communication or initiating communication with the gateway. For example, the gateway 18 may have a capability of detecting and tracking the location of each user terminal with which the gateway is communicating. This may be accomplished by an appropriate locating algorithm programmed into the gateway which uses the signals relayed by multiple satellites to locate the user terminal on the earth's surface. Otherwise, the user terminal may include a position determining device, the location data from which may be transmitted by the user terminal on one of the return link overhead channels. The user terminal type (i.e. vehicle mounted or hand-held) may be included in the information signals transmitted by the user terminal 13 to the gateway 18 during registration (and from the gateway 18 to the master controller 380). Preferably, the master controller 380 may also be aware of the position, at any given time, of all the satellites 12 in the constellation of satellites of the communication system 10 as well as the number of FDM channels available in the region of the earth illuminated by each satellite's return link antenna 12c', 12c". Satellite position data may be established from telemetry data transmitted by the satellites to the gateway. The master controller 380 may otherwise be programmed with additional system architecture parameters as well as other ancillary information to facilitate selection of the FDM channels as will be described in further detail below. In an alternate embodiment, the gateway 18 may be aware of the position of all the satellites 12 in the constellation of satellites of the communication system 10 at any given time. The gateway may also be aware of the number of FDM channels available in the region of the earth illuminated by each satellite's return link antenna 12c', 12c". In addition, the gateway 18 may further be programmed with additional system architecture parameters as well as other ancillary information to facilitate selection of the FDM channels as will be described in further detail below.

Figure 6:
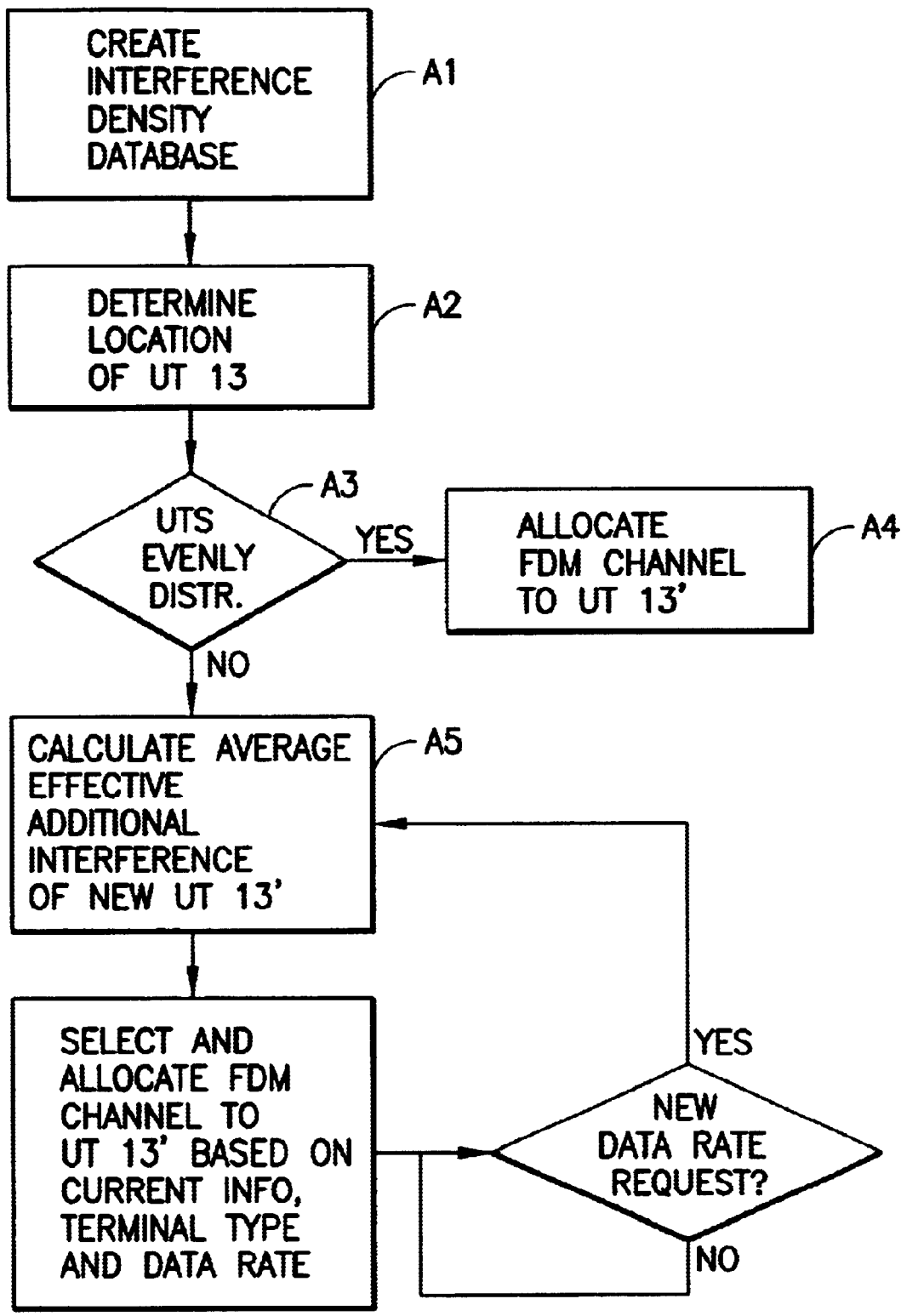
FIG. 6 is a flow chart graphically depicting the method for allocating FDM channels to return link users of the communication system of FIG. 1.

Referring now to FIG. 6, there is shown a flow chart which graphically illustrates the method for allocating FDM channels to return link users. An overview of the method is substantially as follows. First, in step A1 of FIG. 6, a database of the interference density to thermal noise ratio ($I_o/N_o$) for every return link FDM channel 190 into each satellite 12 is initially created at some initial time $t_o$. After this database is created, in step A2 the location and type of a given user terminal 13' is determined when the user terminal 13' makes a request for service to the gateway 18. The request for service may include a requested data rate. During a session the data rate request can be made which increases or decreases the current data rate. This may occur multiple times during a connection.

With the location and type of the new user terminal 13' (i.e. the user terminal requesting service) identified, then in step A3 a determination is made as to the geographical distribution of other user terminals 13 communicating with the gateway 18 via the same satellites 12 as the new user terminal 13'. If it is determined that the user terminals 13, 13' are substantially evenly distributed, then in step A4 of FIG. 6, an FDM channel is allocated to the new user terminal 13' such that all the FDM channels have a substantially uniform user distribution. However, if it is determined that the user terminals 13, 13' are not uniformly distributed geographically, then in Step A5, the average effective additional interference ($\Delta I_o/N_o$) from the new user terminal 13' is calculated for each return link FDM channel into the satellites used by the new user terminal 13'. From the additional interference, the appropriate FDM channel is selected and allocated in Step A6 to minimize the total interference on the FDM channels of the satellites 12 as will be described in greater detail below. After FDM allocation in step A6, the user terminal 13' may request an increase or decrease in the current data rate as mentioned above, and as shown in step A7 of FIG. 6. In the event the user terminal 13' makes such a request, the average effective additional interference ($\Delta I_o/N_o$) from the user terminal 13' is again calculated in step A5 for each return link FDM channel into the satellites used by the user terminal 13'. From the additional interference, an appropriate FDM channel is again selected and allocated in Step A6 to minimize the total interference on the FDM channels of the satellites 12. As mentioned above, the user terminal 13' may make a data rate change request multiple times during a connection.

For each new terminal requesting service, steps A2–A6 of the above described procedure are repeated as necessary.

The database created in Step A1 of FIG. 6, is generated, using an appropriate processor in the master controller 380 of the GOCC 38. In an alternate embodiment, the database created in Step A1 of FIG. 6 may be generated by a controller in the gateway 18. The database includes values for the ratio of interference density to thermal noise density ($I_o/N_o$) for each FDM channel 190 within each return link beam of each satellite 12 in the constellation of satellites of the communication system 10. A schematic representation of this database 200 of ($I_o/N_o$) values is shown in FIG. 5 as a three dimensional matrix with the beams and FDM channels arranged respectively in rows and columns arrayed by satellite. This database 200 generally represents the net interference status on all the FDM channels 190 of the return links 17b into each of the satellites 12 of the satellite constellation of the communication system 10 (see also FIG. 1). The data base is created at some initial time or epoch ($t_0=0$) during operation of the satellite communication system 10. This initial time may coincide with the start of service of the communication system 10. The thermal noise density $N_o$ is a predetermined value which is a function of the satellite's 12 communication payload and is otherwise registered in the master controller processor of the GOCC 38 or a controller in the gateway 18. The thermal density $N_o$ may be identified, for example, a priori from ground testing of each satellite's communication payload. The interference density $I_o$ on each FDM channel of each beam may be referenced, by example, at the return uplink Low-Noise-Amplifier (LNA) (not shown) which is part of the L-band antenna 12d of each satellite 12. Otherwise, the interference density $I_o$ may be referenced anywhere within each satellite's 12 communication electronics chain. The data base 200 of ($I_o/N_o$) values is periodically updated. Each of the interference density to thermal noise ($I_o/N_o$) values in the data base 200 is dynamically adjusted over time relative to the initial epoch ($t_0=0$). The adjustments to the ($I_o/N_o$) values may be performed at some pre-defined time increments by either the gateway 18 or the GOCC 38. For example, adjustments to the values in the data base 200 could be made every minute either in near real time at the gateway 18 and/or in a predictable mode at the GOCC 38. Initially, the ($I_o/N_o$) values in the data base 200 may be established by either following the methods described below from the start of service, or otherwise derived analytically based on a priori knowledge of the locations of the user terminals 13 and satellites 12 at a given time, based on suitable return link analyses techniques.

Referring now to FIGS. 3B, 4 and 6, the location of a given user terminal 13' is determined in Step A2 of FIG. 6, whenever a request for service is made by the user terminal to the gateway 18. The request for service may be made in response to a need to establish a communication link between the user terminal 13' and gateway 18, or may be generated so as to handoff an already established link from one satellite to another. Generally, the request for service is made by the user terminal 13' at some time t after the initial epoch $t_0$. The location of the user terminal 13' requesting service is used in conjunction with information otherwise stored in the master controller processor or the gateway 18 to determine, at time t, which satellites 12', 12" are visible to that user terminal 13', the corresponding beams of the satellites illuminating the user terminal 13' as well as the number of FDM channels 190 otherwise available to the user terminal 13'. In addition to the location of the user terminal, the type of user terminal 13' requesting service (i.e. hand-held or vehicle mounted radio-telephone) is also established in step A2 of FIG. 6. From the type of user terminal, the master controller 380 of the GOCC 38, or the gateway 18, may then determine the link closure requirements (e.g. energy-per-bit to noise-density ratio, antenna characteristics) which are different for different types of user terminals. The link closure requirements can be used to either mix or segregate user terminals 13 within an FDM channel.

If in Step A2 it is determined that all user terminals 13, 13' visible to the given satellites 12', 12" are substantially uniformly located on the ground, then the return link FDM channel 190 is allocated to the new user terminal 13' in step A4 to distribute the transmitting user terminals substantially uniformly on all FDM channels 190. In this case, the uniform assignment approach may be appropriate to minimize the total interference density to thermal noise ratio ($I_o/N_o$) within any FDM channel into the satellites 12', 12". If the traffic through the gateway 18 serving the given geographic region does not warrant the full complement of available FDM channels the number of available FDM channels may be reduced accordingly in that region. Reducing the number of available FDM channels reduces the cost of the gateway 18 due to reduced hardware, software and maintenance requirements.

If the user terminals 1 are determined, however, not to be uniformly distributed on the ground, the next step (i.e. step A5 of FIG. 6) is to calculate the average (over time) effective additive interference ratio ($\Delta I_o/N_o$) the new user terminal 13' will add if it is assigned to any one of the available return link FDM channels 190. The normalization factor (thermal density $N_o$) is arrived at as previously described. The additive interference density ($\Delta I_o$) of the new user terminal 13' is calculated for all return link FDM channels 190 (in this case there are thirteen FDM channels though this number may vary) of all covisible satellites 12', 12" (in this case there are two covisible satellites though this number may also vary) through which the return link 17b, 19b to the gateway 18 may be established. The additive interference density is preferably calculated by the master controller 380 of the GOCC 38. The additive interference ($\Delta I_o$) is generally defined by the ratio ($P_r/r_i$) where $P_r$ represents the power of the new user terminal's 13' transmission received at each covisible satellite L-band antenna 12d and $r_i$ is the bandwidth (e.g. 1.23 MHz) for each FDM channel (i=1–13 in this case). The transmission received power $P_r$ is in turn generally related to the transmit power $P_t$ of the user terminal 13' requesting service. The transmit power $P_t$ demanded of the user terminal 13' so that it may be assigned to any of the available FDM channels 190 may be determined using conventional return link closure analyses techniques.

For example, the power $P_t$ of the user terminal 13' to transmit on any FDM channel 190 is generally a function of factors such as: a) the range between transmitter and receiver and corresponding space loss; b) the gain and losses of the user terminal's antenna 13a and satellite's L-band antenna 12c', 12c'' (in particular the gain of the L-band antenna beam where the new user terminal 13' is currently located); c) L-band antenna 12c', 12c'' beam efficiency; d) the average data rate of the user terminal 13'; e) voice activity effects; f) the overall interference on the FDM channels 190; g) the transmit power of stations transmitting to other RF services in the geographical location of the new user terminal 13' and h) the expected duration of transmission of the new user terminal 13'. The master controller 380 of the GOCC 38 is suitably programmed to quantify the above listed factors from ephemeral data received from the user terminals 13, the satellites 12 and gateways 18, or otherwise from data registered in the master controller processor.

It should be noted that in an alternate embodiment the gateway 18 may calculate the additive interference density and further may be suitably programmed to quantify the above listed factors from ephemeral data received from the user terminals 13, the satellites 12, or otherwise from data registered in the gateway 18 itself.

In this case, for example, the range (factor (a)) between the transmitter and receiver is calculated from the location of the user terminal 13', identified in Step A2, and that of each relaying satellite 12', 12'' registered previously in the gateway 18 and/or the master controller 380. The L-band antenna beam efficiency (factor (c)), (i.e. the roll-off characteristics of neighboring beams from which unintended energy is impinging into the FDM channel within the beam illuminating the new user terminal 13') is otherwise established through prior testing of the L-band antenna 12c', 12c'' and then registered in the master controller 380. The average transmission data rate (factor (d)) and the voice activity effects (factor (e)) of the terminal are quantified from predictive models (which state what an average user terminal may transmit for different percentages of time at different data rates and identify a margin on the average data rate to account for instantaneous data rates different than the average value). The overall interference (factor (f)) on the FDM channels (an indication of the number of user terminals 13 already active within each of the FDM channels) is identified from the database matrix 200 (see FIG. 5) created in Step A1 and updated as described further below. The expected duration of transmission (factor (h)) is a value also generated preferably by the master controller 380 of the GOCC 38 based on accepted predictive methods which attempt to account for the time period that the new user terminal 13' will be transmitting at the average data rate (in this case a period of two minutes may be selected though, other time periods may be chosen as desired). Alternatively, the expected duration of transmission (factor (h)) may be generated by the gateway 18.

The transmit power of stations for other RF services (factor (g)) operating proximate to the location of the new user terminal 13', such that they may potentially interfere with the terminal's transmissions, is generally predicted by the master controller 380 of the GOCC 38 using one or more of the following methods. For example, the master controller 380 may be programmed with information identifying potentially interfering RF services (e.g. those RF services expected to be using radio frequencies proximate the L-band bandwidth used by the return link 17b of the communication system 10) around the world. From this pool, the master controller 380 identifies those services sufficiently proximate geographically to the location of the new user terminal 13', identified in Step A2, to cause interference. The master controller 380 of the GOCC 38 then establishes the number of transmitting stations and characteristics associated with these services. Otherwise, the master controller 380 may use a predictive factor for these systems that includes some assumptions with respect to the number and characteristics of the RF services potentially interfering with the user terminal 13 transmissions. (e.g. A reasonable assumption may be that the number and characteristics of other system's stations are equal to those of the satellite communication system 10. A scaling factor may also be applied based on the assumption that the other system's transmit power may be scaled as the square of the ratio of the altitude (or average of the slant ranges) of the other system's satellites to the altitude (or average of the slant ranges) of the satellites 12 of the communication system 10.)

It should be noted that, in an alternate embodiment, the transmit power of stations for other RF services (factor (g)) may be predicted by the gateway 18.

The master controller 380 of the GOCC 38 employs the above listed factors in the return link closure analysis to find the transmit power demand $P_t$ on the new user terminal 13' so that it may transmit on any FDM channel 190 of each relaying satellite 12', 12''. The received power $P_r$ at the LNA of the satellite's L-band antenna 12c', 12c'' is then calculated, also for each FDM channel, based on the user terminal's transmit power $P_t$ adjusted by the path gain (i.e. space loss and antenna characteristics; previously identified factors (a) and (b)). Finally, the additive interference ($\Delta I_o$) value into each FDM channel 190 at each satellite 12', 12'' may then be determined from the ratio ($P_r/r_i$) of the received power at the LNA of the satellite's L-band antenna 12c', 12c'' to the FDM channel bandwidth. The additive interference ($\Delta I_o$) represents the increase in interference into each of the available FDM channels 190 within each of the covisible satellites 12 from addition of the new user terminal 13'. The additive interference is normalized by the thermal density value $N_o$ to find the additive interference density ($\Delta I_o/N_o$). By evaluating ($\Delta I_o/N_o$) at each satellite's L-band antenna 12d and using this parameter as the metric of comparison across all the FDM channels 190, the effect of different path losses (i.e. space loss and antenna characteristics) and user terminal transmit power $P_t$ are substantially accounted for.

The return link closure analysis, as described above, will yield a series of values of the additive interference density ($\Delta I_o/N_o$) which may be plotted with respect to time per FDM channel 190 to account for effects arising from movement of the relay satellites 12', 12'' with respect to the new user terminal 13'. The effects of the satellite's movement (i.e. orbital rotation) relative to the new user terminal 13' on the interference density of the FDM channels 190 is shown in FIGS. 7A–7C. FIGS. 7A–7C are three graphs of the total interference density ($I_o+\Delta I_o)/N_o$ plotted over time for three representative return link FDM channels (i.e. the first 190A, the second 190B and the thirteenth 190M FDM channels, see also FIG. 3B). Each graph shows a set of curves (121, 122 in FIG. 7A; 123, 124 in FIG. 7B and 125, 126 in FIG. 7C), each curve in the set corresponding to the particular FDM channel received into one of the relay satellites 12', 12". In this case, there are two relay satellites 12', 12" and hence two curves per set. The total interference density $(I_o+\Delta I_o)/N_o$ represents the cumulative interference into each FDM channel 190 from the user terminals 13 already active, at time t, within each of channel (this base interference density $(I_o/N_o)$ value is given by database 200) and the additive interference density $(\Delta I_o/N_o)$ of the new user terminal if added to each channel. Each curve in the graphs of FIGS. 7A–7C shows the change to the total interference density $(I_o+\Delta I_o)/N_o$ per channel per satellite due to relative motion of the satellite with respect to the new user terminal 13' over the expected duration of the call (for example, two minutes). Here, the graphs of FIGS. 7A–7C portray the case where one satellite 12" is retreating and the other satellite 12' is approaching the new user terminal 13' along their orbital paths. Thus, referring to FIG. 7A, if the user terminal 13' were assigned to the first FDM channel 190A (also see FIG. 3B), the total interference to thermal noise density in the first channel 190A of satellite 12" may be mapped as curve 122, and in the first channel 190A of satellite 12' as curve 121. Curve 122 is decreasing (i.e. decreasing interference) over the call duration because satellite 12' is moving closer to the user terminal 13' (presenting a higher elevation angle relative to the user terminal). Curve 121 is increasing (i.e. increasing interference) because satellite 12' is moving farther away (presenting a lower elevation angle relative to the user terminal). The interference curves in FIG. 7B (curves 123, 124) and in FIG. 7C (curves 125, 126) are similar in curvature (i.e. rate of change) to those in FIG. 7A, though the magnitudes may be different. Similar sets of curves would be generated by the master controller 380 of the GOCC 38 for each return link FDM channel 190 (in this case, thirteen sets of curves would be generated, one for each of the thirteen FDM channels). The master controller 380 of the GOCC 38 then averages (with respect to time) each of these curves leading to, in this case, twenty six averaged predicted total interference values (one for each of the thirteen return link channels per satellite times two visible satellites). The result is a predicted average total interference on each return link channel 190 into each relay satellite 12", 12' from transmission by the new user terminal 13'. The rate of change (i.e. curvature) of the interference curves 121"126 in FIGS. 7A–7C is shown only for example purposes and may be different in actuality. For example, if the satellite communication system 10 of the preferred embodiment has active power control, as it exists in a satellite communication system such as the Globalstar™ system, the rate of change in the curves may be significantly lower (and will actually be flat in the case of ideal power control). In addition, the set of curves for each channel need not have one curve with a positive (increasing) rate of change and the other with a negative (decreasing) rate of change. Both curves may have negative a rate of change, as in the case where both satellites are approaching the user terminal 13'. Alternatively, in the case where both satellites are retreating from the user terminal, both curves may have a positive rate of change.

While the return link closure analysis is described above as being performed by the master controller 380 of the GOCC 38, it should be noted that, in an alternate embodiment, that the return link closure analysis may be performed by the gateway 18.

For notational simplicity, the average expected total interference density per return link channel per satellite will be referred to hereafter as $\mu(j,k)$ where: $\mu=(I_o+\Delta I_o)/N_o$; j corresponds to a specific return link FDM channel (e.g. j=1 for the first FDM channel 190A, j=2 for the second FDM channel 190B and so on to j=13 for the thirteenth FDM channel 190M of the return link) and k corresponds to a specific satellite (e.g. k=1 for satellite 12", k=2 for satellite 12'). Therefore, the parameter $\{\mu\}$ may be defined as a two dimensional [13×2] matrix 270 as shown in FIG. 8, because there are, by example, thirteen available FDM channels 190A–190M (j=1–13) and two visible satellites 12", 12' (k=1,2) to the user terminal 13'.

Figure 9:
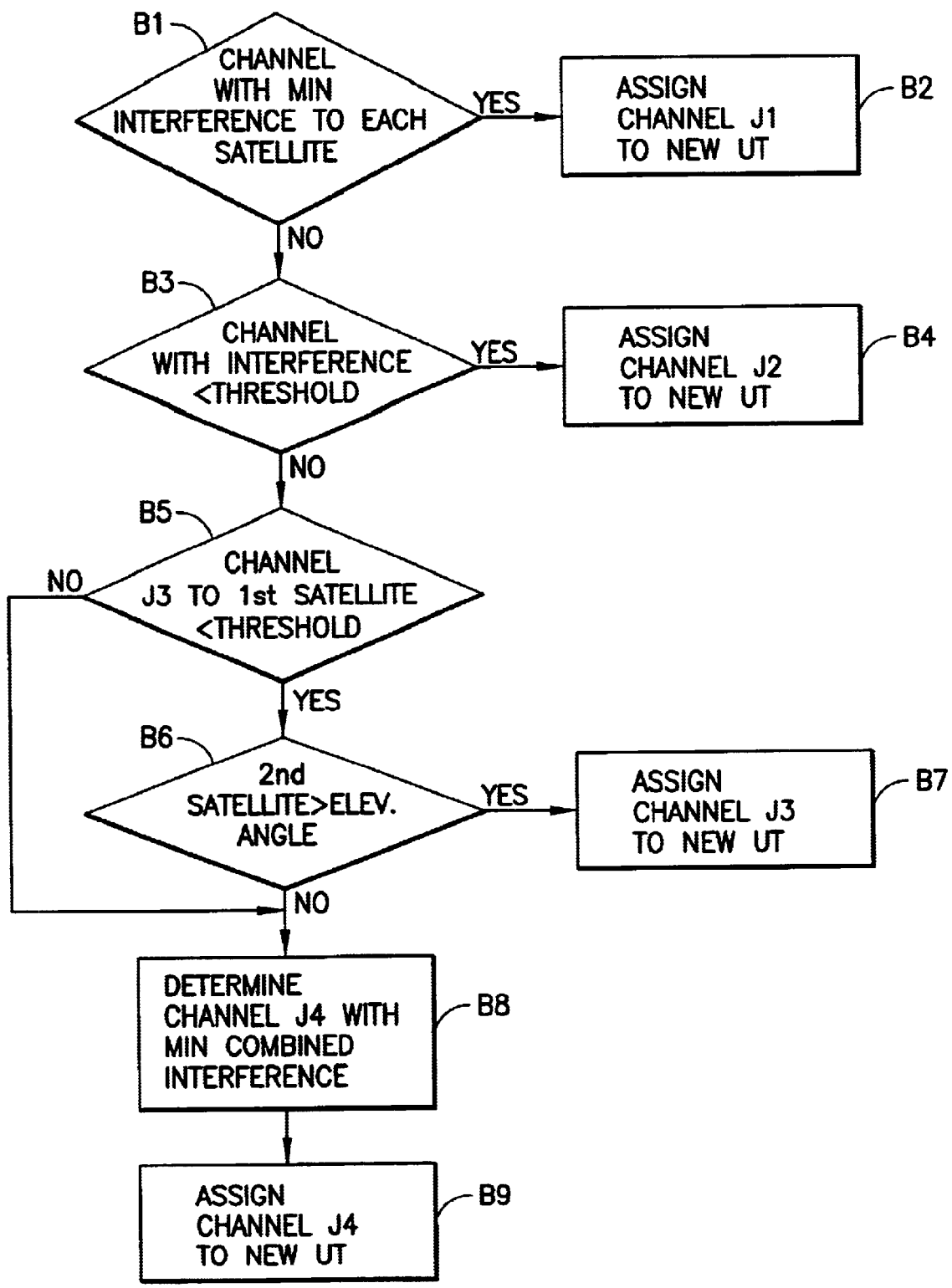
FIG. 9 is a flow chart graphically depicting a subsequence of the method depicted in FIG. 6 for allocating FDM channels to return link users of the communication system of FIG. 1.

The master controller 380 of the GOCC 38, or in the alternative, the gateway 18, in step A6 of FIG. 6, selects and assigns the appropriate FDM channel 190 to the user terminal 13' requesting service in accordance with the procedure described below with reference to the flow chart in FIG. 9. Thus, the procedure depicted in the flow chart of FIG. 9 is a sub-sequence included in step A6 of FIG. 6. In step B1 of the flow chart in FIG. 9, a determination is made as to whether there is a common FDM channel $j_1$ to each satellite 12", 12' (e.g. channel $(j_1,1)$ and $(j_1,2)$) such that the predicted average total interference $\mu(j_1,1)$ and $\mu(j_1,2)$ of that channel to each satellite is the minimum average total interference $\mu(j,k)$ from the channels 190A–190M (j=1–13) in the return link 17b to the corresponding satellite 12", 12' (i.e. $\mu(j_1,1) \leq \mu(1-13,1)$ and $\mu(j_1,2) \leq \mu(1-13,2)$). If there is a channel $j_1$ common to both satellites (i.e. $(j_1,1)$ and $(j_1,2)$) having the minimum interference density p in comparison to the other channels to the corresponding satellite 12", 12', then in step B2, the new user terminal 13' is assigned the channel $j_1$. If, however, the channel having the lowest interference density in each satellite is not the same channel (e.g. $\mu(1,1)$ is the lowest interference density in satellite 12" but $\mu(5,2)$ is the lowest interference density in satellite 12') then in step B3, a determination is made as to which FDM channel $j_2$ to both satellites has an average interference density $\mu(j_2,1)$ and $\mu(j_2,2)$ less than a predetermined threshold value. This threshold value may be determined from system simulations or based on operational (trend analyses) data and modified as appropriate. If such an FDM channel $j_2$ is found in step B3, then in step B4, the new user terminal 13' is assigned to the FDM channel $j_2$.

Otherwise, if there is no channel common to both satellites having an interference density $\mu(j_2,1)$ and $\mu(j_2,2)$ less than the predetermined threshold value, then in step B5 a determination is made whether the average interference density of the channel $j_3$ in one satellite, for example, $\mu(j_3,2)$ in satellite 12' (k=2), is less than the threshold (the average interference density $\mu(j_3,1)$ of the comparable channel in the other satellite 12" (k=1) being greater than the threshold). If Yes, then in step B6, a further determination is made whether the elevation angle between the user terminal 13' and satellite 12" (k=1), corresponding to the channel $j_3$ with the higher interference density $\mu(j_3,1)$, is higher than the elevation angle to satellite 12' (k=2) having the channel $j_3$ with the lower interference density $\mu(j_3,2)$. If Yes, then in step B7 and the user terminal 13' is assigned to that FDM channel $j_3$. This results in the satellite 12", at the higher elevation angle having (see FIG. 4) to suffer greater interference. This is acceptable because visible satellite 12' at the lower elevation angle presents a worse overall path to the signals and therefore needs to have a lower overall interference.

If the answer in step B5 is No, (i.e. the channels to both satellites 12", 12' have an average interference density $\mu(j,k)$ greater than the threshold value) steps B6 and B7 are skipped and step B8 is performed. As shown in FIG. 9, step B8 is also performed if the answer in step B6 is No (i.e. the satellite 12" corresponding to the channel $j_3$ having an interference density below the threshold value has a higher elevation than the satellite 12' with the channel $j_3$ having an interference density above the threshold value). In step B8, a determination is made as to which channel $j_4$ has the minimum combined average interference density $(\mu(j_4,1)+\mu(j_4,2))$ across both satellites 12", 12' (k=1–2) from the combined interference density $(\mu(1-13,1)+\mu(1-13,2))$ across both satellites for all available channels 190A–190M (j=1–13). Then, in step B9 of FIG. 9, the user terminal 13' is assigned to this FDM channel $j_4$. This is essentially a fall-back position which will assure that, on an average, the visible satellites 12", 12' will experience lower interference.

After the new user terminal 13' is assigned a communication channel, the interference database represented by matrix 200 (see FIG. 5) may then be updated. The database matrix 200 is updated by entering the additional interference value $\mu(j,k)$, as calculated above, for the appropriate channel $j_{1-4}$ to which the new user terminal 13' was assigned in the satellites and beams through which the return link is established. For example, if FDM channel 190A (i.e., j=1) is deemed the appropriate FDM channel $j_{1-4}$ to assign the user terminal 13' (in any of steps B2, B4, B7 or B9 of the procedure in FIG. 9) the total interference $(I_o/N_o)$ value for channel 190A (j=1) in all of the visible satellites 12", 12' in the database are replaced with the calculated total interference values $\mu(1,k)$ for the subject channel and satellites 12", 12'. When the user terminal 13' requests a termination of services, the additional interference $(\Delta I_o/N_o)$ for the subject channel 190A and visible satellites 12", 12', as calculated above, may then be subtracted from the updated $\mu(1,k)$ value in the database and the new updated total interference density value stored in the database matrix 200. As each new user terminal requests and terminates service, this process is repeated with the interference within each FDM channel 190 of each beam of each satellite (registered in the database matrix 200) being continually updated. This database matrix 200 thus represents a continuous mapping of the overall interference to thermal noise densities within each of the satellites 12 in the constellation of satellites of the communication system 10, and is used to optimally assign new user terminals within the set of available FDM channels 190.

It is also within the scope of this invention to use the directional capability of fixed user terminals 16 with directional antennas to minimize the interference in a return link FDM channel 190. The directional antennas may include antennas that are steerable and-non steerable. The steerable, or pointable, antennas may be mechanically steerable (e.g., by using a gimball) or electronically steerable. The steerable antennas may also include those capable of producing a number of fixed directional beams, and steering may be accomplished by beam selection. Referring still to FIG. 4, included among the clusters of user terminals 13, 13' communicating through covisible satellites 12", 12' are fixed radio-telephones 16' with directional antennas 13b'. Some of the fixed radio-telephones 16' of the satellite communication system 10 may have steerable directional antennas 13b' so that the antenna may track a satellite 12", 12' along its orbital path. Other fixed radio telephones of the communication system 10 may have substantially non-steerable directional antennas (not shown). In the case of fixed radio-telephones with steerable directional antennas 13b', the antenna 13b' may be pointed at a satellite 12", 12' which has a minimum number of hand-held radio-telephones already allocated thereto. An overall indication as to the number of user terminals already allocated to a given satellite 12", 12' may be obtained from the updated database matrix 200 which identifies the total interference density per channel per satellite as previously mentioned. As also mentioned above, the information from the updated database matrix 200 may be obtained from the master controller 380 of the GOCC 38, or in an alternative embodiment may be obtained by circuitry in the gateway 18.

The type of the user terminals already communicating on the satellite is registered by the master controller 380 (i.e. from the data obtained in step A2 of the channel allocation process depicted by the flow chart in FIG. 6). Thus, when the fixed radio-telephone 16' with a steerable directional antenna requests service from the gateway 18, the master controller 380 of the GOCC 38 locates the position of the terminal and identifies the terminal as being a fixed radio-telephone (step A2 of FIG. 6). The master controller 380 then identifies the satellite 12", 12' with the lowest number of hand-held radio-telephones from the visible satellites and commands the fixed radio-telephone 16' to steer its directional antenna 13b' so as to aim at that satellite. The communication link between the fixed radio-telephone and gateway is then established through that satellite. This further minimizes the interference in an FDM channel which is serving handheld user terminals. In the case of a fixed radio-telephone with a non-steerable antenna, the directional nature of the antenna may otherwise be utilized to allocate that user terminal to a satellite 12", 12' with a minimum number of hand-held user terminals. Here, at the time the fixed user terminal requests service, the master controller 380 of the GOCC 38 is otherwise aware that the terminal is a fixed radio-telephone and also of the orientation of the field of view of the non-steerable directional antenna of the terminal. The master controller 380 may then proceed to assign the fixed radio-telephone to the satellite used by a minimum of the hand-held user terminals which is within the field of view of the non-steerable directional antenna of the fixed radio-telephone.

In an alternate embodiment, use of the directional capability of fixed user terminals 16 may be accomplished by the gateway 18. The type of user terminals already communicating on the satellite may be registered by the gateway 18 and, when the fixed radio-telephone 16' with a steerable directional antenna request services from the gateway 18, the gateway 18 locates the position of the terminal and identifies the terminal as being a fixed radio-telephone (step A2 of FIG. 6). The gateway 18 then identifies the satellite 12", 12' with the lowest number of hand-held radio-telephones from the visible satellites and commands the fixed radio-telephone 16' to steer, or point, its directional antenna 13b' so as to aim at that satellite. The communication link between the fixed radio-telephone and gateway is then established through that satellite. At the time a fixed user terminal with a non-steerable antenna requests service, the gateway 18 is otherwise aware that the terminal is a fixed radio-telephone and also of the orientation of the field of view of the non-steerable directional antenna of the terminal. The gateway 18 may then proceed to assign the fixed radio-telephone to the satellite used by a minimum of the hand-held user terminals which is within the field of view of the non-steerable directional antenna of the fixed radio-telephone.

In both cases above, the system 10 minimizes interference in FDM channels where hand-held user terminals are assigned, because the transmit power of hand-held radio-telephones is generally more limited (due to limited battery power, desire to extend talk time). The typically high antenna gain characteristic of fixed radio-telephones as well as the ability to operate nominally at a lower energy per bit to noise density rate $E_b/(N_o+I_o)$ than mobile user terminals (because the fixed user terminals remain stationary with a clear line-of-sight to the satellites and operate in an additive white Gaussian noise propagation channel) makes the fixed radio-telephones 16 preferable to assign to FDM channels containing hand-held user terminals.

The present invention provides for a more optimal loading of the satellites 12 in the satellite communication system 10 (see FIG. 1), with a concomitant improvement in system capacity and a reduction in user terminal transmit power needs.

While the invention has been described as utilizing the master controller 380 of the GOCC 38 or, in an alternative embodiment, as using circuitry in the gateway 18, it should be realized that the invention is not limited to being achieved either in the master controller 380 or the gateway 18. The invention may be implemented exclusively in the master controller 380, or exclusively in the gateway 18, or may be implemented in a manner that includes both the master controller 380 and the gateway 18.

Although described in the context of a DS-CDMA communication system, it should be realized that this invention also has applicability to other satellite communication systems that utilize, by example, Time Division Multiple Access (TDMA) techniques. This invention may also be applied to other than low earth orbit (LEO) satellite communication systems, such as medium earth orbit (MEO) satellite communication systems, or geo-synchronous (GEO) satellite communication systems.

Thus, while this invention has been particularly shown and described with respect to preferred embodiments thereof, it will be understood by those skilled in the art that changes in form and detail may be made therein without departing from the scope and spirit of this invention.

What is claimed is:

1. A method for maximizing capacity of a satellite communication system comprising the steps of:
    finding a total interference in each channel of a plurality of channels which subdivide a predetermined frequency band of a return link to each satellite from a plurality of satellites of the communication system;
    calculating a predicted total interference from an addition of a first user terminal on each channel of the plurality channels in the return link to each of at least two satellites of the plurality of satellites;
    determining if the predicted total interference in a first channel of the plurality of channels is a minimum value relative to all predicted total interference values; and
    allocating the first channel to the first user terminal if the predicted total interference in the first channel is the minimum value.

2. A method as in claim 1, wherein if the predicted total interference in the first channel is not a minimum, the method further comprises the step of determining if the predicted total interference in a second channel is less than a predetermined threshold value; and allocating the second channel to the first user terminal if the predicted total interference in the second channel is less than the threshold value.

3. A method as in claim 2, wherein if the predicted total interference in the second channel is not less than the threshold value, the method further comprises the steps of:
    determining if the predicted total interference in a third channel is less than the threshold value;
    if yes, then determining if the first satellite is at an elevation angle, relative to the user terminal, that is smaller than an elevation angle of a second one of the two satellites; and
    if yes, allocating the third channel to the first user terminal.

4. A method as in claim 3, wherein if the predicted total interference in the third channel is not less than the predetermined threshold, or if the elevation angle of the first satellite is not smaller than the elevation angle of the second satellite, the method further comprises the step of allocating the user terminal a fourth channel, wherein the fourth channel exhibits a minimum combined average interference density across said first and second satellites, from the combined interference density across said first and second satellites for all available channels.

5. A method as in claim 1, wherein the step of finding the total interference comprises the steps of:
    calculating an interference in each channel of the plurality of channels of the return link to each satellite at a predetermined initial time; and
    updating the interference in each channel of the plurality of channels of the return link to each satellite by adding the interference of each user terminal allocated to a corresponding one of the channels and subtracting the interference of each user terminal which terminates service on the corresponding channel.

6. A method as in claim 5, wherein the interference in each channel of the plurality of channels of the return link to each satellite is updated at predetermined time periods after the initial time.

7. A method as in claim 1, further comprising the step of registering the total interference in each channel of the plurality of channels of the return link to each satellite in a database of the satellite communication system.

8. A method as in claim 1, wherein the step of calculating a predicted total interference comprises the step of identifying a location and type of the first user terminal when the user terminal request service.

9. A method as in claim 1, wherein a processor of the satellite communication system registers other radio frequency services located proximate to the first user terminal.

10. A method as in claim 1, wherein the predicted total interference is calculated when the first user terminal requests service.

11. A method for assigning a frequency channel to a user terminal of a satellite communication system, the user terminal being illuminated by at least two satellites from a plurality of satellites of the communication system, wherein the method comprises the steps of:
    identifying at least one of a location and a type of the user terminal when the user terminal requests service;
    determining if a first frequency channel from a plurality of frequency channels for a return link of the user terminal to each one of the two satellites has a minimum total interference density relative to the plurality of frequency channels;
    if yes, assigning the first frequency channel to the user terminal;
    if no, then determining if a second frequency channel from the plurality of frequency channels for the return link of the user terminal to each satellite has a total interference density below a predetermined threshold;
    if yes, assigning the second frequency channel to the user terminal;
    if no, then determining if a third frequency channel from the plurality of frequency channels has a total interference density below the predetermined threshold for the return link of the user terminal to a first one of the two satellites and a total interference density above the predetermined threshold for the return link of the user terminal to a second one of the two satellites;

if yes, then determining if the first satellite is at a lower elevation with respect to the user terminal than the second satellite;

if yes, then assigning the third channel to the user terminal; and if no, or if the total interference density in the third frequency channel for the return link of the user terminal to the first satellite is above the predetermined threshold, then assigning a fourth frequency channel from the plurality of frequency channels for the return link of the user terminal; wherein the fourth frequency channel exhibits a minimum combined average interference density across said first and second satellites, relative to the combined interference density across said first and second satellites for all available channels.

* * * * *